United States Patent [19]
Smith

[11] 3,949,272
[45] Apr. 6, 1976

[54] GROUND-FAULT PROTECTIVE SCHEME FOR MULTIPLE-SOURCE ELECTRIC DISTRIBUTION SYSTEM

[75] Inventor: Eugene M. Smith, West Chester, Pa.

[73] Assignee: General Electric Company, New York, N.Y.

[22] Filed: Nov. 19, 1974

[21] Appl. No.: 525,150

[52] U.S. Cl............ 317/18 D; 317/27 R; 317/28 R
[51] Int. Cl.² .......................................... H02H 3/28
[58] Field of Search .... 317/18 D, 27 R, 28 R, 28 B, 317/18 R, 29 R, 29 B

[56] References Cited
UNITED STATES PATENTS

| | | | |
|---|---|---|---|
| 2,335,103 | 11/1943 | Bolsterli | 317/28 B |
| 3,223,891 | 12/1965 | McClymont | 317/27 R |
| 3,259,802 | 7/1966 | Steen | 317/18 |
| 3,488,559 | 1/1970 | Souillard | 317/18 D |
| 3,721,862 | 3/1973 | Brrennen | 317/18 D |

*Primary Examiner*—J. D. Miller
*Assistant Examiner*—Patrick R. Salce
*Attorney, Agent, or Firm*—Robert A. Cahill; Walter C. Bernkopf; Frank L. Neuhauser

[57] ABSTRACT

A ground-fault protective scheme for a three-phase electric distribution system that comprises two sources having neutral points that are interconnected by a neutral conductor and a separate ground connection for each neutral point located at or near the neutral point. The protective scheme responds correctly to a ground fault even though the current resulting from such ground fault may return to its source through either of said ground connections and may distribute itself in any proportion between said ground connections.

9 Claims, 9 Drawing Figures

NOTE
RELAY COIL G1 CONTROLS OPENING OF BREAKERS M1 AND T.
RELAY COIL G2 CONTROLS OPENING OF BREAKERS M2 AND T.

Fig. 1.

NOTE
RELAY COIL G1 CONTROLS OPENING OF BREAKERS M1 AND T.
RELAY COIL G2 CONTROLS OPENING OF BREAKERS M2 AND T.

Fig. 8.

NOTE
RELAY COIL G1 CONTROLS OPENING OF BREAKERS M1 AND T
RELAY COIL G2 CONTROLS OPENING OF BREAKERS M2, T, AND T3
RELAY COIL G3 CONTROLS OPENING OF BREAKERS M3 AND T3

Fig. 9.

GROUND-FAULT PROTECTIVE SCHEME FOR MULTIPLE-SOURCE ELECTRIC DISTRIBUTION SYSTEM

BACKGROUND

This invention relates to a ground-fault protective scheme for an electric distribution system and, more particularly, to a protective scheme of this type which is especially adapted for use with a three-phase four-wire system comprising two sources having neutral points that are interconnected by the fourth, or neutral, wire of the system.

Various ground-fault protective schemes have been developed for systems of this type, but typically they depend for proper operation upon there being a single connection between the neutral wire and ground. Examples of such protective schemes are shown in an article by Dunki-Jacobs et al in the magazine Industrial Power Systems, Volume 16, Issue 1, Mar. 1973, pages 15–19, published by General Electric Company at Schenectady, N.Y., and in U.S. Pat. No. 3,558,981—Zocholl. Also of interest is U.S. Pat. No. 3,259,802—Steen, assigned to the assignee of the present invention.

For improved safety, it is sometimes required that this type of system, instead of having a single common ground connection, have separate ground connections for the neutral point of each source located at or near such neutral point. The protective schemes described on pages 17–19 of the above-cited Industrial Power Systems article and in Zochnoll patent will not properly protect such a system since they depend upon all ground fault current returning to its source through a single ground connection.

SUMMARY

Accordingly, an object of my invention is to provide a ground-fault protective scheme that is capable of functioning properly even when applied to a multiple-source system that has a separate ground connection for the neutral point of each source located at or near such neutral point.

Multiple-source systems typically include a bus associated with each source, a main circuit breaker for connecting the source with its associated bus, and a tie circuit breaker for interconnecting the buses. If such a system is being operated with the tie circuit breaker closed and a ground fault from one of the buses occurs, it is necessary with most prior protective schemes to delay opening of any main circuit breaker until the tie breaker can be opened. Until then, these protective schemes cannot determine which main circuit breaker should be opened in order to clear the fault.

Another object of my invention is to provide, for a multi-source system including a sometimes-closed tie breaker, a ground-fault protective scheme that can determine prior to opening of the tie breaker which particular bus has the ground fault on it and can thus initiate opening of the appropriate main circuit breaker needed for proper fault-isolation without waiting for the tie breaker to open.

Another object is to provide ground-fault protective means that can be applied to a multiple-source distribution system that has more than two sources.

In carrying out the invention in one form, I provide for a multiple-source, three-phase, four-wire distribution system of the type referred to above, ground-fault protective means that comprises: (a) a first current sensor located adjacent a first one of said main circuit breakers for generating a current through its output terminals that varies directly with the vector sum of the currents through the phase conductors and the neutral conductor at the location of said first sensor, (b) a second current sensor located adjacent the second main circuit breaker for generating a current through its output terminals that varies directly with the vector sum of the currents through the phase conductors and the neutral conductor at the location of said second sensor, and (c) a third current sensor located adjacent the tie circuit breaker for generating a current through its output terminals that varies directly with the vector sum of the currents through the tie bus and the neutral conductor at the location of said third current sensor. Connected across the output terminals of the first current sensor is a first ground-fault responsive relay that operates upon effective energization to produce opening of said first main circuit breaker if closed and of said tie breaker if closed. Connected across the output terminals of said second current sensor is a second ground-fault responsive relay that operates upon effective energization to produce opening of said second main circuit breaker if closed and of said tie breaker if closed. The output terminals of said first, second, and third current sensors are connected in series with each other in a differential circuit. The polarity of said third sensor is so arranged with respect to the polarity of the first and second sensors that in response to a ground fault on one of the buses, said differential circuit produces effective energization of the relay that is operable to produce opening of the main circuit breaker that is located at the same side of the tie breaker as the fault.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMENTS

Figure 1:
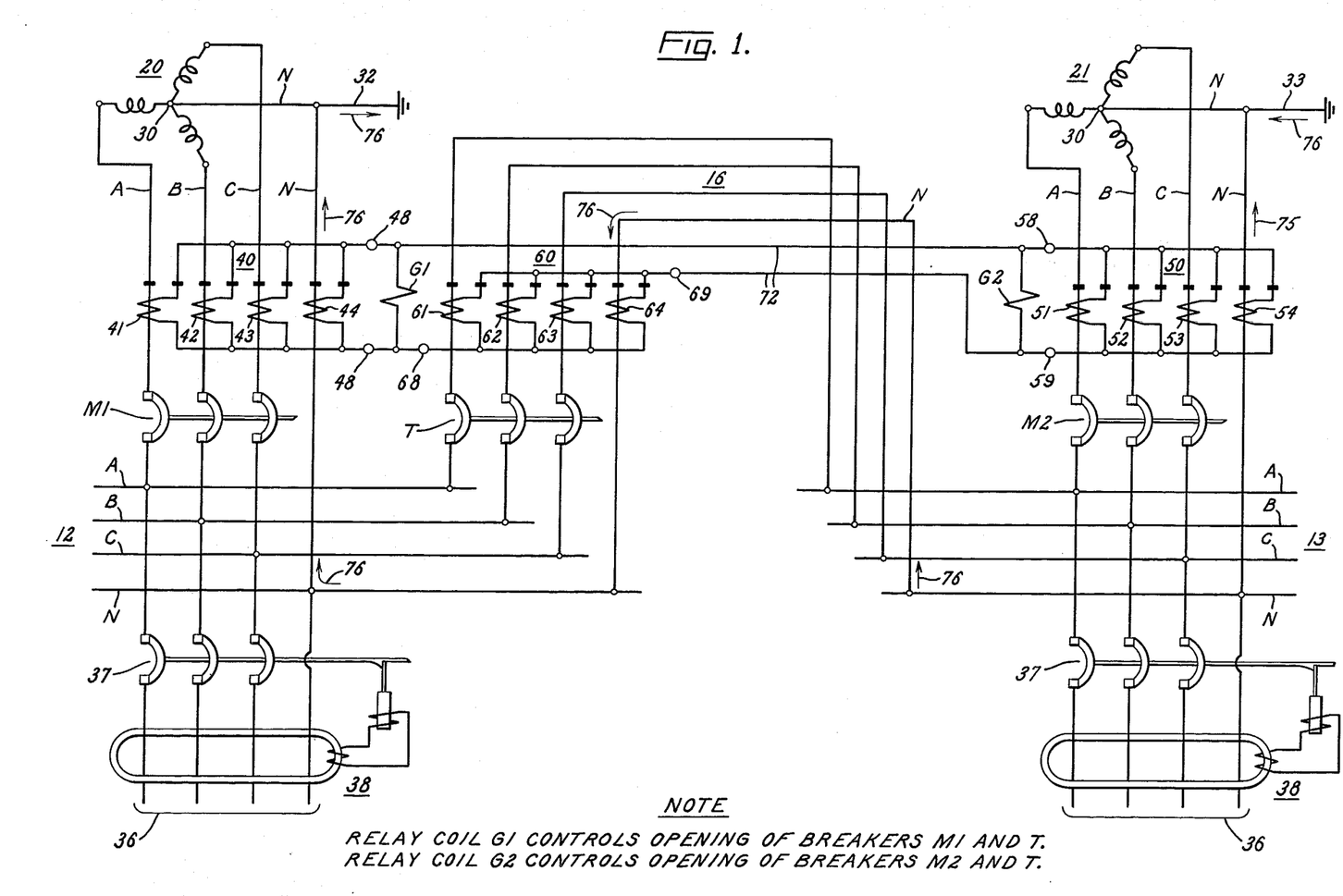
FIG. 1 is a circuit diagram of a ground-fault protective scheme embodying one form of my invention.

Referring now to FIG. 1, there is shown a three-phase, four-wire electric distribution system comprising two main buses 12 and 13 and a tie bus 16 interconnecting the two main buses. Each bus is a 3-phase bus comprising three phase-conductors respectively designated A, B, and C. The system further comprises two separate power sources 20 and 21 which are respectively connected to the main buses 12 and 13 through main circuit breakers M1 and M2 when the main circuit breakers are closed. Opening of main circuit breaker M1 disconnects source 20 from its associated bus 12, and opening of main circuit breaker M2 disconnects source 21 from its associated bus 13. The tie bus contains a tie circuit breaker T that, when closed, connects the two main buses 12 and 13 together and, when open, opens the tie bus to disconnect the two main buses from each other.

Each source 20 and 21 is shown as comprising a transformer secondary comprising three phase-windings, or conductors, connected in a wye configuration with a neutral point 30 between the windings. The neutral points of the two sources are solidly interconnected by a fourth wire, or neutral conductor, that is designated N. Each of the neutral points is connected to ground by mans of its own ground connection, one being designated 32 and the other 33. To conform with certain safety requirements of the National Electrical Code, the ground connection (32 or 33) for each source is located at a point between the source and the associated main circuit breaker that connects the source to its associated bus.

Connected to the buses 12 and 13 are feeder circuits such as 36. Each of these feeder circuits is used to supply power from the associated bus to loads connected in the feeder circuit. The connection between the feeder circuit and its associated bus is controlled by a feeder circuit breaker 37 shown in the closed position. If a ground fault occurs on any feeder circuit, its associated feeder circuit breaker 37 is quickly opened in a conventional manner to isolate the faulted feeder circuit from the remainder of the system. A suitable ground-fault responsive device for effecting such opening of an associated feeder breaker 37 is schematically depicted at 38. A specific example of such a device is disclosed in U.S. Pat. No. 3,721,862—Brennen et al.

If a ground fault should occur on bus 13, it is usually necessary to open the tie circuit breaker T and the main circuit breaker M2 in order to isolate the fault from the rest of the system. Under such circumstances main circuit breaker M1 should remain closed to permit uninterrupted service from source 20 to continue over the sound bus 12.

Similarly, if a ground fault should occur on bus 12, the main circuit breaker M1 and the tie circuit breaker T should be opened to isolate the fault on bus 12, and main circuit breaker M2 should remain closed to maintain service from source 21 on the sound bus 13.

The main circuit breaker M2 is controlled by a ground-fault responsive relay, the operating coil of which is shown at G2. This coil is normally effectively deenergized. Effective energization of this coil G2 (i.e., energization by current above a predetermined level) causes the associated relay to produce opening of the tie breaker T if it is then closed and the main circuit breaker M2 if it is then closed. The tripping circuit for producing such a circuit-breaker opening in response to relay operation is not shown since it can be of any suitable conventional design.

The other main circuit breaker M1 is controlled by a ground-fault responsive relay having a normally-deenergized coil G1. Effective energization of this coil G1 causes the associated relay to produce opening of the tie breaker T if it is then closed and the main circuit breaker M1 if it is then closed. The tripping circuit for producing such circuit-breaker opening in response to such relay operation is not shown since it can be of any suitable conventional design.

Effective energization of the relay coils G1 and G2 is controlled by a ground-fault sensing circuit 72 containing three current sensors 40, 50, and 60, each of which is responsive to the vector sum of the currents through the primary conductors at the location of the individual sensor.

The first current sensor 40 is located in the region of the main circuit breaker M1 and, in the illustated embodiment, comprises four current transformers having secondary windings 41, 42, 43, and 44 respectively coupled to the primary conductors A, B, C, and N adjacent the main circuit breaker M1. These secondary windings are connected in parallel, and the parallel combination has terminals 48 and 49 across which the relay coil G1 is connected. The first current sensor 40 develops a current through the terminals 48 and 49 that is substantially proportional to the vector sum of the currents through primary conductors A, B, C, and N at the location of sensor 40. So long as this vector sum is zero, current sensor 40 develops no effective secondary current through the terminals 48 and 49, but this secondary current increases as this vector sum increases.

In. FIG. 1, the polarities of the current transformer windings in the sensor 40 are indicated by the square black dots adjacent the windings. More specifically, when primary current enters a given primary winding through the black dot adjacent this primary winding, secondary current leaves the associated secondary winding through the black dot adjacent the secondary winding. When the direction of the primary current is reversed, the direction of the secondary current is correspondingly reversed. This same convention is used for all the current transformers.

For sensing the vector sum of the currents through the conductors A, B, C, and N in the region of the second main circuit breaker M2, a second current sensor 50 substantially identical to the first current sensor 40 is provided. This second current sensor 50 comprises current transformer secondary windings 51, 52, 53, and 54 respectively coupled to primary conductors A, B, C, and N adjacent the main circuit breaker M2. These secondary windings are connected in parallel, and the parallel combination has terminals 58 and 59 across which relay coil G2 is connected. Current sensor 50 develops a current through terminals 58 and 59 that is substantially proportional to the vector sum of the currents through primary conductors A, B, C, and N at the location of the current sensor 50.

For sensing the vector sum of the current through tie bus 16 and the adjacent portion of the neutral conductor N, a third current sensor 60 is provided. This current sensor comprises current transformer secondary windings 61, 62, 63, and 64 respectively coupled to the primary conductors A, B, C, and N immediately adjacent the bus tie breaker T. These secondary windings 61, 62, 63, and 64 are also connected in parallel, and the parallel combination has terminals 68 and 69. Current sensor 60 develops a current through its terminals 68 and 69 that is substantially proportional to the vector sum of the currents through primary conductors A, B, C, and N at the location of the third current sensor 60.

It is to be understood that all of the current transformers have substantially the same transformation ratio and are otherwise substantially identical. There may be some minor differences in saturation properties, causing slight error currents through the output terminals, but the relays G1 and G2 are set sufficiently high that these slight error currents can be ignored.

The first and second current sensors 40 and 50 are themselves connected in a differential circuit 72, and the third current sensor 60 is connected in this differential circuit 72 in series with the first and second current sensors with respect to current passing between the first and second current sensors in the differential circuit 72. This differential circuit 72 is shown in simplified form in FIG. 2. Stated in another way, the output terminals of the three sensors 40, 50, and 60 are connected in series in differential circuit 72.

The operation of the protection scheme under various conditions will now be described. In analyzing where the secondary currents will flow in the differential circuit 72, it must be remembered (a) that for a significant current to flow in a given secondary winding, there must be a corresponding current flow in the primary conductor of said secondary winding and (b) that Kirchhoff's first law must be satisfied at each junction point (i.e., the algebraic sum of all instantaneous currents at each such point must equal zero).

If it is assumed that the tie breaker T is open, it will be apparent that any phase-to-phase load on either bus will result in the vector sum of the currents through each of the sensors, 40, 50, and 60, beng substantially zero, and there will thus be no effective energization of relay coils G1 and G2.

Let us next assume that the tie breaker T is open and that a phase-to-neutral load is present on bus 13. If all of the return current from this load flows back to the source 21 via the neutral conductor N in the direction of arrow 75 of FIG. 1, it will be apparent that the vector sum of the primary currents through the sensor 50 is again zero, and no effective energization of either of the relay coils G1 or G2 will occur.

Figure 2:
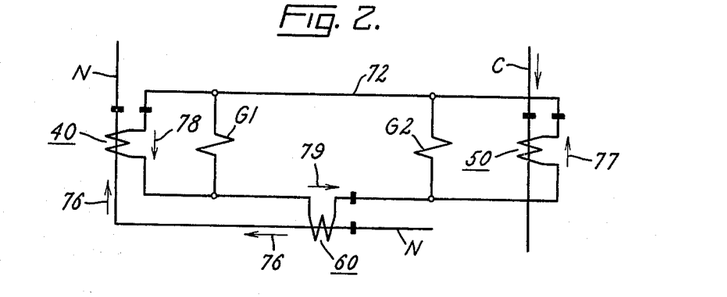
FIG. 2 is a simplified diagram depicting a portion of the protective scheme of FIG. 1, assuming the tie circuit breaker is open, a phase-to-neutral load on bus 13, and all the return current from the load returning via a path that extends successively through the neutral conductor N and the ground connection 32 of the source 20, then through ground to the ground connection 33 of the other source 21.

Let us next assume that the tie breaker T is open, that a phase-to-neutral load is present on bus 13, but that all of the return current from the load returns to source 21 via the arrows 76 of FIG. 1. (Arrows 76 follow a path through the neutral conductor to ground connection 32 of source 20 and then through ground to the ground connection 33 of source 21.) This condition is depicted in FIG. 2, where it can be seen that each sensor 40, 50, and 60 will generate one unit of secondary current, as shown at 78, 77, and 79, respectively. This one unit of secondary current simply circulates around the differential circuit 72 without energizing either relay coil G1 or G2, which is as desired.

Figure 3:
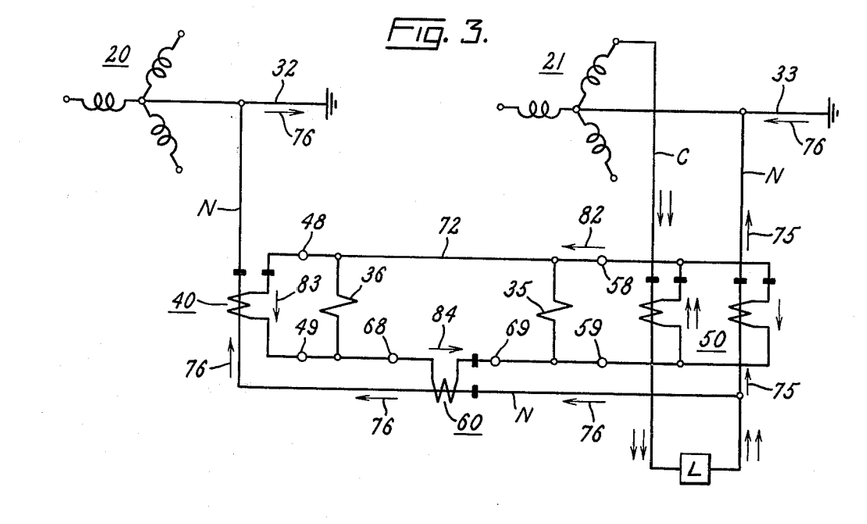
FIG. 3 is a simplified diagram similar to that of FIG. 2, except assuming that the return current is distributed between the return path of FIG. 2 and a second path comprising a direct connection between the load and source 21 via the neutral conductor N of the system.

Assume next that the tie breaker T is open, that a phase-to-neutral load drawing two units of primary current form source 21 is present on bus 13, but that one unit of return current from the load follows path 75 and the other unit follows path 76 in returning to source 21. This condition is depicted in FIG. 3. In FIG. 3, sensor 50 is generating a net of one unit of secondary current depicted by arrow 82 flowing through output terminal 58. Sensors 40 and 60 are each generating one unit of secondary current, as depicted by the arrows 83 and 84 of FIG. 3. The net result is that one unit of secondary current circulates around the differential circuit 72 without effectively energizing either relay G1 or G2, which is as desired.

Figure 4:
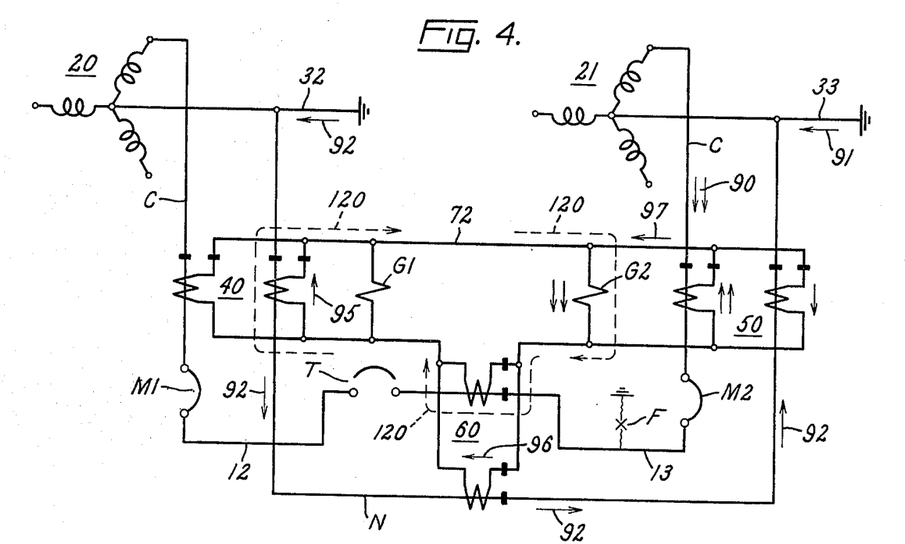
FIG. 4 is a circuit diagram, partially in one-line form, showing the system with the tie circuit breaker open, the main circuit breakers closed, and a ground fault on bus 13.

Assume next that the conditions depicted in FIG. 4 prevail. In this figure, the tie breaker T is open, the main circuit breakers M1 and M2 are closed, and there is a ground fault F on bus 13 from phase C to ground. Assume further that two units of current flow through phase C toward the fault as shown by the arrows 90 of FIG. 4 and that one unit returns to the source 21 through ground via the ground connection 33 of the source 21 as shown by the arrow 91 of FIG. 4. Assume further that the other unit of primary current returns to source 21 via the path depicted by arrows 92 of FIG. 4. The sensors will respond as depicted in FIG. 4. Sensor 40 will see a net of one unit of primary current and will generate one unit of secondary current as depicted by arrow 95 in FIG. 4. Sensor 60 will see one unit of primary current through its neutral conductor N and will generate one unit of secondary current as depicted by arrow 96 of FIG. 4. Sensor 50 will see a net of one unit of primary current and will generate one unit of secondary current, the magnitude and direction of which is depicted by arrow 97 of FIG. 4. The net result of these secondary currents 95, 96, and 97 is that relay coil G2 will be energized by two units of secondary current (as indicated by the two arrows adjacent G2), and relay coil G1 will remain unenergized. Thus, the relay with coil G2 will operate to produce opening of the main circuit breaker M2, whereas main circuit breaker M1 will remain closed. Since tie breaker T is assumed to be already open, the faulted bus 13 will be isolated from the rest of the system, and service can be maintained on the bus 12 through main circuit breaker M1.

Figure 5:
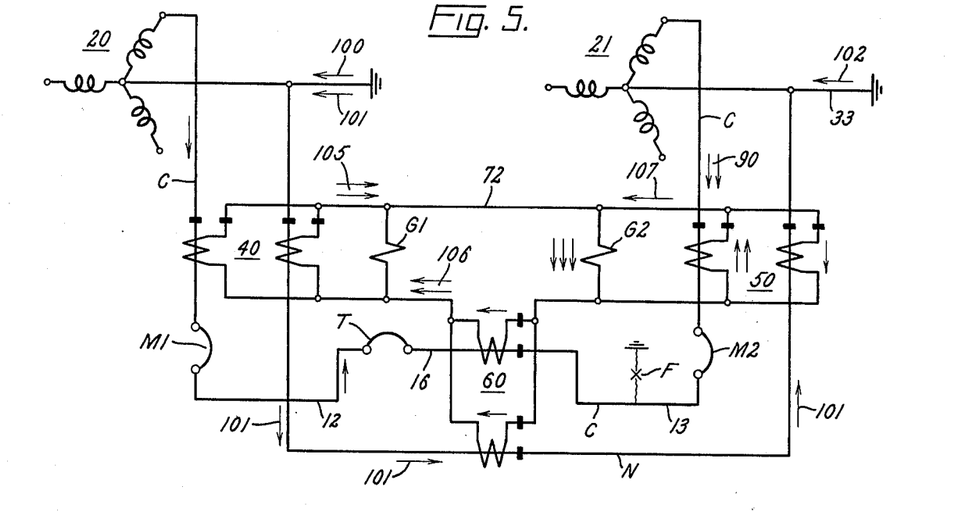
FIG. 5 is a circuit diagram, partially in one-line form, showing the system with the tie circuit breaker closed, the main circuit breakers closed, and a ground fault on bus 13.

Assume next that all the circuit breakers M1, M2, and T are closed and that a phase-to-ground fault occurs on bus 13 as shown in FIG. 5. Assume further that source 21 supplies two units of primary current through breaker M2 to bus 13, and source 20 supplies one unit of primary current through closed tie breaker T to bus 13. Assume further that the ground return current from the fault divides as follows: one unit of return current returns to source 20 as indicated by arrow 100, and one unit returns to source 21 as indicated by arrows 101, and one unit returns to source 21 as indicated by arrow 102. These primary currents will cause sensor 40 to generate two units of seconary current, the direction and magnitude of which are depicted by arrows 105 in FIG. 5. Sensor 60 will develop two units of secondary current as depicted by arrows 106 in FIG. 5. Sensor 50 will develop one unit of secondary current as depicted by arrow 107 in FIG. 5. The net result of these secondary currents is that relay coil G2 will be energized by three units of secondary current, but relay coil G1 will remain unenergized. Such energization of coil G2 will result in breakers M2 and T being opened to isolate the fault on bus 13, whereas main breaker M1 will remain closed, and service will be maintained on bus 12.

Figure 6:
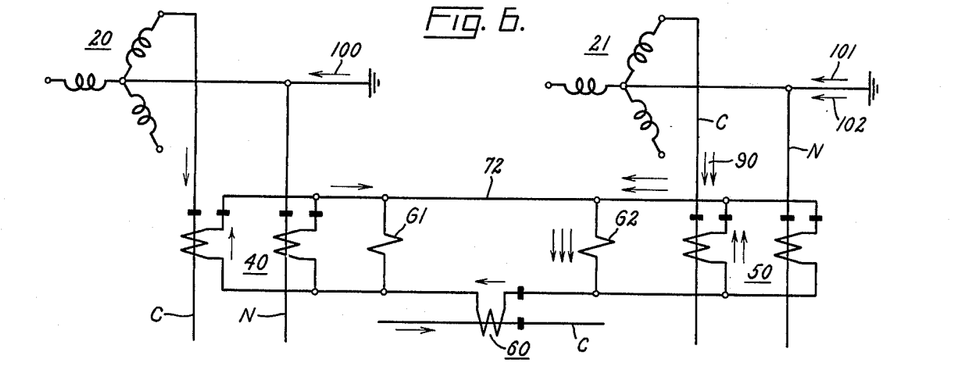
FIG. 6 depicts the same conditions as depicted in FIG. 5 except that it assumes a different distribution of the ground return current.

It can be shown that the same end result will take place irrespective of the distribution of the ground return current. For example, if ground return current 101 of FIG. 5 took the same return path as ground return current 102 in FIG. 5, the differential circuit 72 would be energized as shown in FIG. 6. As in FIG. 5, this would result in relay coil G2 being energized by three units of secondary current, and the relay coil G1 remaining unenergized.

Whether the tie breaker is open or closed, it can be shown, in the same manner as above described, that a ground fault on bus 12 will cause the differential circuit 72 to produce effective energization of relay coil G1 and no effective energization of relay coil G2. This will cause the faulty bus 12 to be isolated from the remainder of the system, as is desired, thus permitting service to be continued over the sound bus 13.

It will be apparent from the above description that for a line-to-ground fault on bus 13, a secondary current proportional to the fault current will flow through relay coil G2. Similarly for a line-to-ground fault on bus 12, a secondary current proportional to the fault current will flow through relay G1. The line-to-ground current may return to its source through either of the ground connections and the neutral conductor, or it may divide between these two paths in any proportion without upsetting the proper flow of current through the relay coils G1 and G2.

It will also be apparent from the above description that the net line-to-neutral load current has available two parallel paths by which it may return to its source at one or both of the transformers, one being entirely through the neutral conductor and the other being partially through the neutral conductor to the ground point near one transformer and then by ground to the other ground connection and thus to the neutral point of the source transformer. As pointed out above in connection with FIG. 3, these extraneous load currents returning through ground will not introduce any current flow in the relay coils for conditions where no ground fault is present.

The operating characteristics of the immediately-preceding two paragraphs are true for any combination of breaker positions (open or closed) of breakers M1, M2, and T.

Although I prefer to construct each of the current sensors of a plurality of current transformer secondary windings connected in parallel, as shown, it is to be understood that my invention in its broader aspects is not so limited. For example, an iron core having a window surrounding all four conductors and a single current transformer secondary linked to said core (as is shown for example in U.S. Pat. No. 3,259,802—Steen, assigned to the assignee of the present invention) can be used instead of the four separate current transformers.

It will be apparent from the above description that my protective scheme, when used in a distribution system having a closed tie breaker, can determine prior to opening of the tie breaker which particular bus has the ground fault on it and can thus initiate opening of the appropriate main circuit breaker M1 or M2 needed for proper fault isolation without waiting for the tie breaker to open. The current sensor 60, in effect, determines the direction and the magnitude of the vector sum of the current flowing between the two halves of the distribution system and, in response thereto, introduces into the differential circuit 72 the proper secondary current needed to produce the correct response of the differential circuit.

It will be apparent from FIG. 4 that there is within the differential circuit 72 a closed circuit loop (indicated by the dotted-line arrows 120) in which the output terminals of the sensor 40, the output terminals of the sensor 60, and the coil of relay G2 are connected in series. The polarity of the sensor 60 is such that it generates a secondary current (96) in this loop of the same polarity as the secondary current (95) generated by the first sensor 40 in response to passage through the sensors of primary currents (92) having vector sums of the same polarity. In this loop, the coil of relay G1 can be considered as connected in parallel with the series combination of coil G2 and sensor 60 with respect to secondary current from sensor 40.

Figure 7:
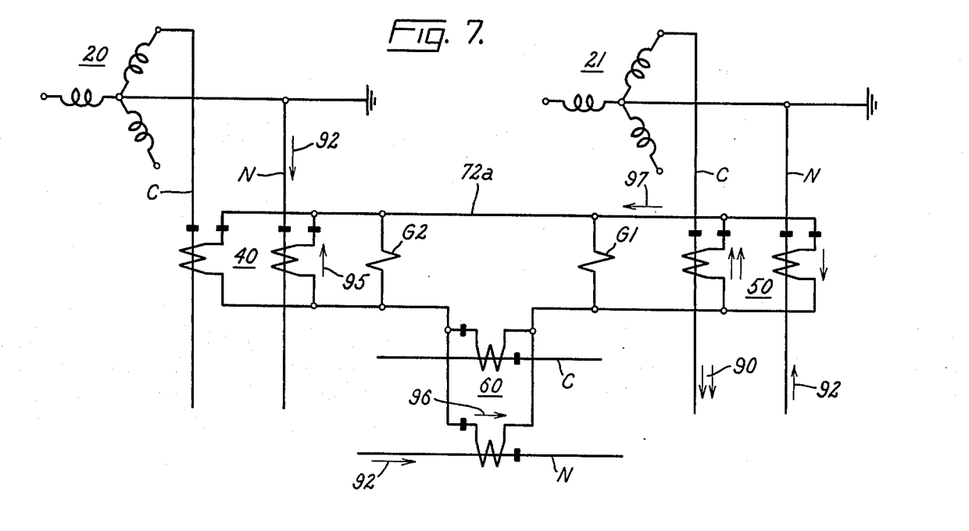
FIG. 7 depicts a modified embodiment of the invention illustrated during the same power system conditions as represented in FIG. 4.

It is possible to obtain the same performance from the protective circuit if the polarity of sensor 60 is reversed from that shown in FIG. 4, provided the circuit positions of relays G1 and G2 are interchanged. Such an alternate arrangement is depicted in FIG. 7 where the differential circuit is designated 72a. When the sensors 40, 60, and 50 are energized by the same primary currents (92) as shown in FIG. 4, the sensors generate through their output terminals the secondary currents 95, 96, and 97, respectively. The presence of these generated currents in the differential circuit 72a results in two units of secondary current through the coil of relay G2 and no secondary current through the coil of relay G1, just as occurs in FIG. 4. It can be shown that for other circuit conditions, the protective scheme of FIG. 7 will operate to produce substantially the same end result as the protective scheme of FIG. 4.

In a preferred form of our invention, the ground-fault responsive relays G1 and G2 are selectively coordinated on a time-overcurrent basis with the ground-fault responsive tripping devices (not shown) for the feeder circuit breakers 37 of FIG. 1. Accordingly, when there is a ground fault on a feeder circuit 36, the appropriate feeder circuit breaker will open before the ground fault responsive relay G1 or G2, as the case may be, can operate. But if the feeder circuit breaker is unsuccessful in clearing the feeder's ground fault, the relays G1 and G2 will provide back-up protection by opening the appropriate main circuit breaker M1 or M2 and tie circuit breaker T required to clear the fault on the feeder.

Figure 8:
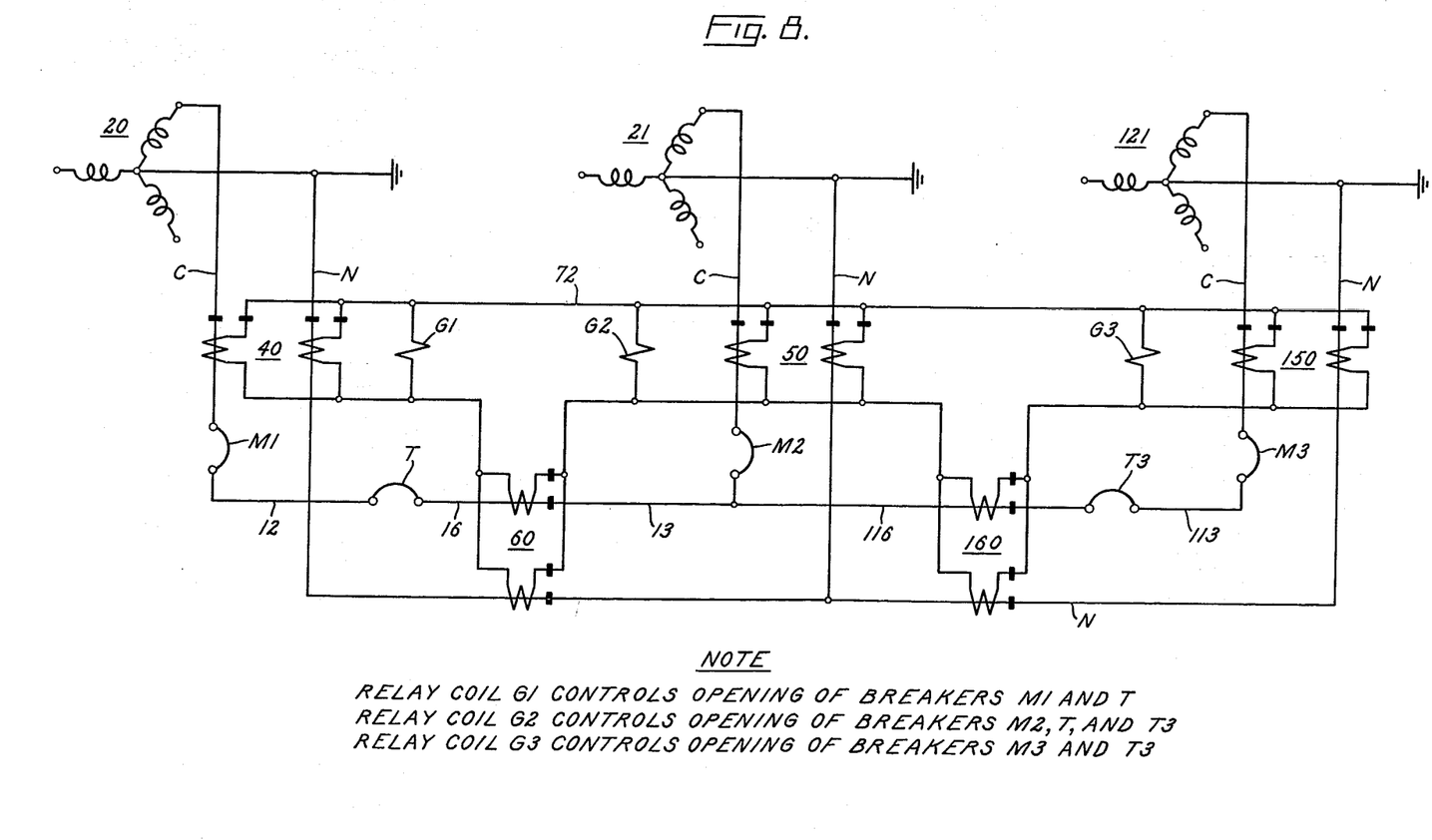
FIG. 8 is a circuit diagram, partially in one-line form, of a modified form of my ground fault protection, applied to a distribution system having three power sources.

Although I have described my protective scheme as being applied to a multi-source distribution system having only two sources, it is also applicable to a system which comprises more than two sources. For example, in FIG. 8 I have shown it applied to a system comprising three sources. This system is the same as that of FIGS. 1-6 except that: (a) an additional bus 113 is connected to bus 13 through a tie breaker T3 and a tie bus 116, (b) an additional source 121 is connected to bus 113 through another main circuit breaker M3, and (c) the neutral point of the additional source 121 is connected to the neutral point of the other sources through conductor N. The differential circuit 72 is expanded to include the series combination of fourth and fifth current sensors 150 and 160, respectively. Sensor 160 is coupled to tie bus 116 and neutral conductor N in a location adjacent the tie breaker T3, and sensor 150 is coupled to neutral conductor N and the circuit that connects the additional source 121 to additional bus 113 in a location adjacent main circuit breaker M3. An additional ground-fault responsive relay is provided for controlling breakers M3 and T3, and this relay has a coil G3 connected across the output terminals of sensor 150. In the differential circuit of FIG. 8, the fifth sensor 160 may be thought of as being connected in series with relay coil G3 and sensor 150, and this series combination as being connected across the output terminals of sensor 50. In FIG. 8, the relays having coils G1 and G2 serve the same functions as in FIGS. 1–6 except that in FIG. 8 the relay with coil G2 also controls the additional tie breaker T3, as specified in the note appended to FIG. 8. If a ground fault develops on bus 13 of FIG. 8, the relay with coil G2 operates to open breakers M2, T, and T3. On the other hand, if a ground fault develops on bus 113, the relay with coil G3 operates to open breakers M3 and T3. This performance is achieved in essentially the same way as described in detail in connection with FIGS. 1–7, and further operating description is therefore believed to be unnecessary.

It is to be understood that all of the sensors of FIG. 8 generate substantial equal currents through their output terminals when the primary currents therethrough are equal.

Figure 9:
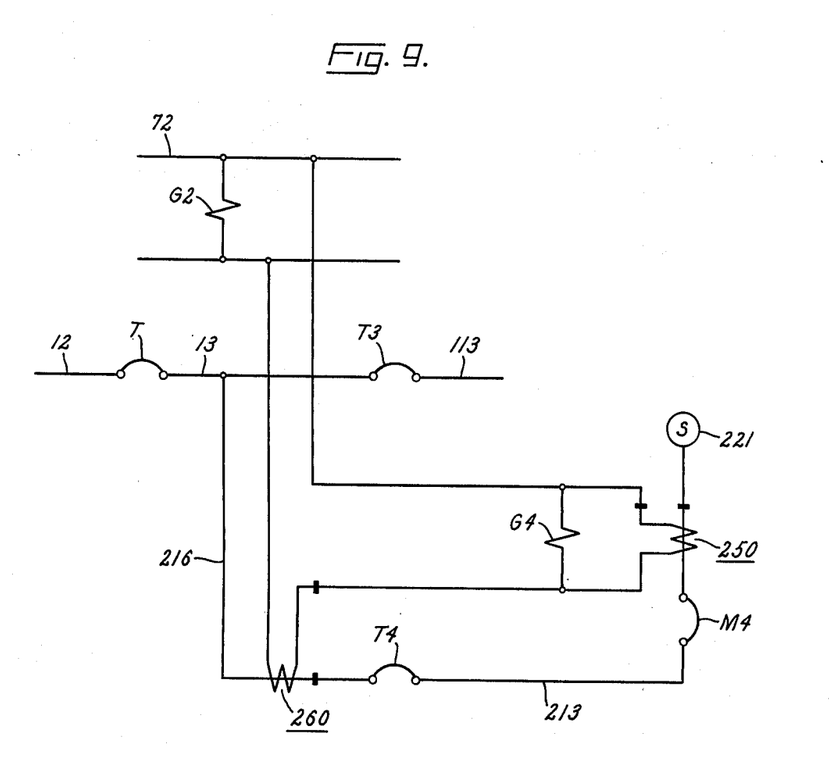
FIG. 9 is a circuit diagram, partially in one-line form, of another modified form of my ground fault protection, applied to a system having four power sources.

If a fourth main bus having its own source is added to the distribution system of FIG. 3, it may be connected through a tie breaker directly to one of the end buses 12 or 113 or, alternatively, to the intermediate bus 13. FIG. 9 schematically shows such a fourth main bus at 213 directly connected to intermediate bus 13 through a tie breaker T4 and tie bus 216. A source 221 with a separately grounded neutral is connected to this fourth main bus 213 through a main breaker M4. Ground fault protection for this four-source system is provided in essentially the same way as described in connection with FIG. 8. More specifically, referring to FIG. 9, the sensors 250 and 260 respectively associated with this fourth main bus and its tie bus generally correspond to sensors 150 and 160 of FIG. 8. An additional ground-fault responsive relay having an operating coil G4 is connected across sensor 250 and in series with sensor 260. This subcircuit comprising components 250, 260 and G4 is connected in differential circuit 72 of FIG. 8 across coil G2. Upon effective energization of coil G4, the associated ground-fault responsive relay opens breakers T4 and M4. In FIG. 9 the relay having coil G2 performs all the functions assigned to it in the circuit of FIG. 8 plus opening tie breaker T4 upon effective energization of coil G2.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. Ground fault protective means for an electrical distribution system that comprises: (i) two polyphase sources, each including a plurality of phase conductors and a neutral point, (ii) a neutral conductor electrically interconnecting said neutral points, (iii) a first polyphase bus and a first polyphase main circuit breaker electrically connected between the phase conductors of said first source and said first bus, (iv) a second polyphase bus and a second polyphase main circuit breaker electrically connected between the phase conductors of said second source and said second bus, (v) a plurality of ground connections respectively connected between said neutral points and ground at a location between said first source and said first main circuit breaker and at another location between said second source and said second main circuit breaker, (vi) a polyphase tie bus comprising phase conductors connected between said two buses, (vii) a tie circuit breaker connected in said tie bus for opening and closing said tie bus, and (viii) feeder circuits respectively connected to said buses for supplying power therefrom to loads on said feeder circuits; said protective means comprising:

a. a first current sensor having a pair of output terminals and located adjacent said first main circuit breaker for generating a current through said output terminals that varies directly with the vector sum of the currents through the phase conductors and the neutral conductor at the location of said first current sensor, b. a second current sensor having a pair of output terminals and located adjacent said second main circuit breaker for generating a current through its output terminals that varies directly with the vector sum of the currents through the phase conductors and the neutral conductor at the location of said second current sensor, c. a third current sensor having a pair of output terminals and located adjacent said tie circuit breaker for generating a current through its output terminals that varies directly with the vector sum of the currents through the phase conductors of said tie bus and the neutral conductor at the location of said third current sensor, d. a first ground-fault responsive relay having an operating component connected across the output terminals of said first current sensor and operable upon effective energization of said operating component to produce opening of said first main circuit breaker if closed and of said tie breaker if closed, e. a second ground fault responsive relay having an operating component connected across the output terminals of said second current sensor and operable upon effective energization of its operating component to produce opening of said second main circuit breaker if closed and of said tie breaker if closed, f. a differential circuit in which the output terminals of said first, second, and third current sensors are connected in series with each other, g. the polarity of said third current sensor being so arranged with respect to the polarity of said first and second sensors that in response to a ground fault on one of said buses, said differential circuit produces effective energization of the operating component of the ground-fault responsive relay that is operable to produce opening of the main circuit breaker that is located at the same side of the tie bus as said fault.

2. Ground-fault protective means as defined in claim 1 in which:

a. said three sensors generate substantially equal values of current through their output terminals when said distribution system is operating with no ground fault present thereon, b. the polarities of said sensors being so arranged that the currents generated by said sensors at any instant are in the same direction in said differential circuit when said distribution system is operating with no ground fault present thereon, thus preventing effective energization of the operating components of said relays when said distribution system is operating with no ground fault present thereon.

3. Ground-fault protective means as defined in claim 1 in which: each of said three sensors generates substantially the same value of current through its output terminals when the vector sums of the currents in the phase conductors and the neutral conductor at the location of each sensor are equal.

4. The ground-fault protective scheme of claim 1 in which:
   a. the current s through the phase conductors and the neutral conductor at each sensor constitute primary currents for the sensor and the current generated through the output terminals of the sensor constitutes secondary current for the sensor,
   b. within said differential circuit there is a closed circuit loop in which the output terminals of said first sensor, the output terminals of said third sensor, and the operating component of said second relay are connected in series,
   c. said third current sensor generates a secondary current in said loop of the same polarity as that generated in said loop by said first sensor in response to passage through said first and third sensors of primary currents having vector sums of the same polarity,
   d. the operating component of said first relay being connected in said loop in parallel with the series combination of the operating component of said second relay and said third sensor with respect to secondary current from said first sensor.

5. The ground-fault protective scheme of claim 1 in which:
   a. the currents through the phase conductors and the neutral conductor at each sensor constitute primary currents for the sensor and the current generated through the output terminals of the sensor constitutes secondary current for the sensor,
   b. within said differential circuit there is a closed circuit loop in which the output terminals of said first sensor, the output terminals of said third sensor, and the operating component of said first relay are connected in series,
   c. said third current sensor generates a secondary current in said loop of an opposite polarity to that generated in said loop by said first sensor in response to passage through said first and third sensors of primary currents having vector sums of the same polarity,
   d. the operating component of said second relay being connected in said loop in parallel with the series combination of the operating component of said first relay and said third sensor with respect to secondary current from said first sensor.

6. Ground fault protective means as defined in claim 1 and as applied to an electrical distribution system that further comprises: (i) an additional polyphase source including a plurality of phase conductors and a neutral point electrically interconnected with the neutral points of said other sources through said neutral conductor, (ii) a third polyphase main circuit breaker connected between the phase conductors of said third source and said third bus, (iii) a ground connection connected between the neutral of said third source and ground at a location between said third source and said third main circuit breaker, (iv) a second polyphase tie bus comprising phase conductors connected between said second and third buses, and (v) a second tie circuit breaker connected in said second tie bus for opening and closing said second tie bus, said protective means further comprising:
   a. a fourth current sensor having a pair of output terminals and located adjacent said third main circuit breaker for generating a current through its output terminals that varies directly with the vector sum of the currents through the phase conductors and the neutral conductor at the location of said fourth current sensor,
   b. a fifth current sensor having a pair of output terminals and located adjacent said second tie circuit breaker for generating a current through its output terminals that varies directly with the vector sum of the current through the phase conductors of said second tie bus and the neutral conductor at the location of said fifth current sensor,
   c. a third ground-fault responsive relay having an operating component connected across the output terminals of said fourth current sensor and operable upon effective energization of its operating component to produce opening of said third main circuit breaker if closed and of said second tie breaker if closed,
   d. the output terminals of said fifth current sensor being connected in series with the output terminals of the said fourth current sensor and the operating component of said third relay to provide a series combination that is connected in said differential circuit across the output terminals of said second current sensor,
   e. the polarity of said fifth sensor being so arranged with respect to that of the other sensors that in response to a ground fault on said third bus, said differential circuit produces effective energization of the operating component of said third relay.

7. Ground-fault protective means as defined in claim 6 in which: each of said five sensors generates substantially the same value of current through its output terminals when the vector sums of the currents in the phase conductors and the neutral conductor at the location of each sensor are equal.

8. Ground-fault protective means as defined in claim 6 in which:
   a. said five sensors generate substantially equal values of current through their output terminals when said distribution system is operating with no ground fault present thereon,
   b. the polarities of said sensors being so arranged that the currents generated by said sensors at any instant are in the same direction in said differential circuit when said distribution system is operating with no ground fault present thereon, thus preventing effective energization of the operating components of said relays when said distribution system is operating with no ground fault present thereon.

9. Ground fault protective means as defined in claim 6 in which said second ground fault responsive relay is operable upon effective energization of its operating component also to produce opening of said second tie breaker if closed.

* * * * *

UNITED STATES PATENT OFFICE
CERTIFICATE OF CORRECTION

PATENT NO. : 3,949,272
DATED : April 6, 1976
INVENTOR(S) : Smith, Eugene M.

It is certified that error appears in the above-identified patent and that said Letters Patent are hereby corrected as shown below:

Column 11, line 65, after "polyphase", insert -- bus and a third polyphase --

Signed and Sealed this eighth Day of June 1976

[SEAL]

Attest:

RUTH C. MASON
Attesting Officer

C. MARSHALL DANN
Commissioner of Patents and Trademarks